UNITED STATES PATENT OFFICE.

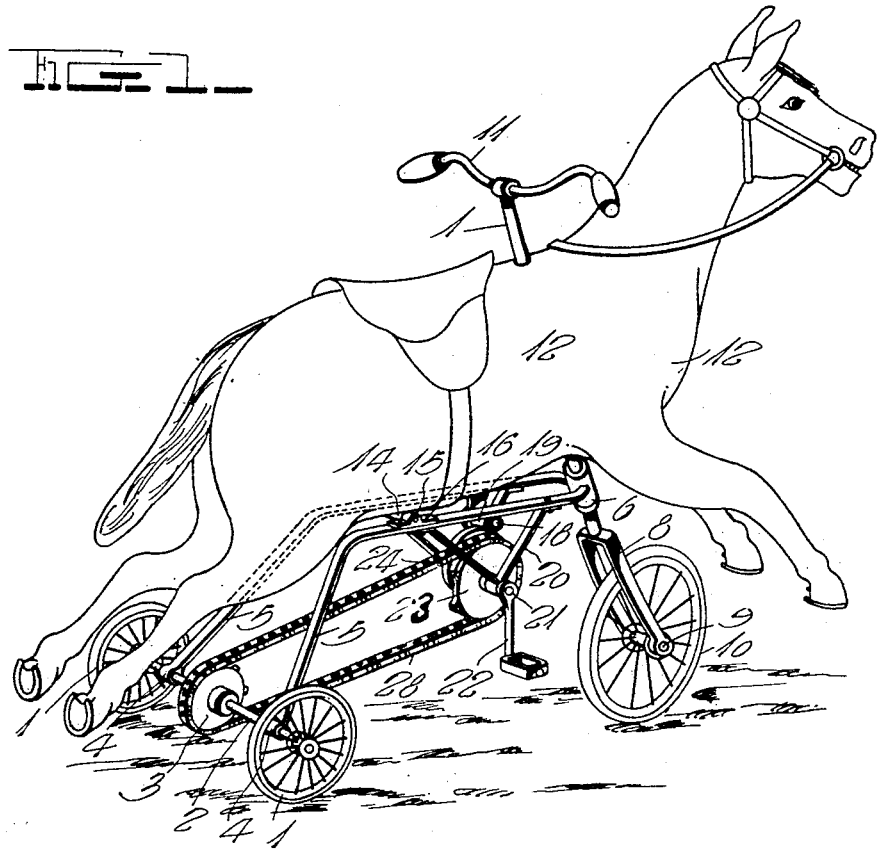

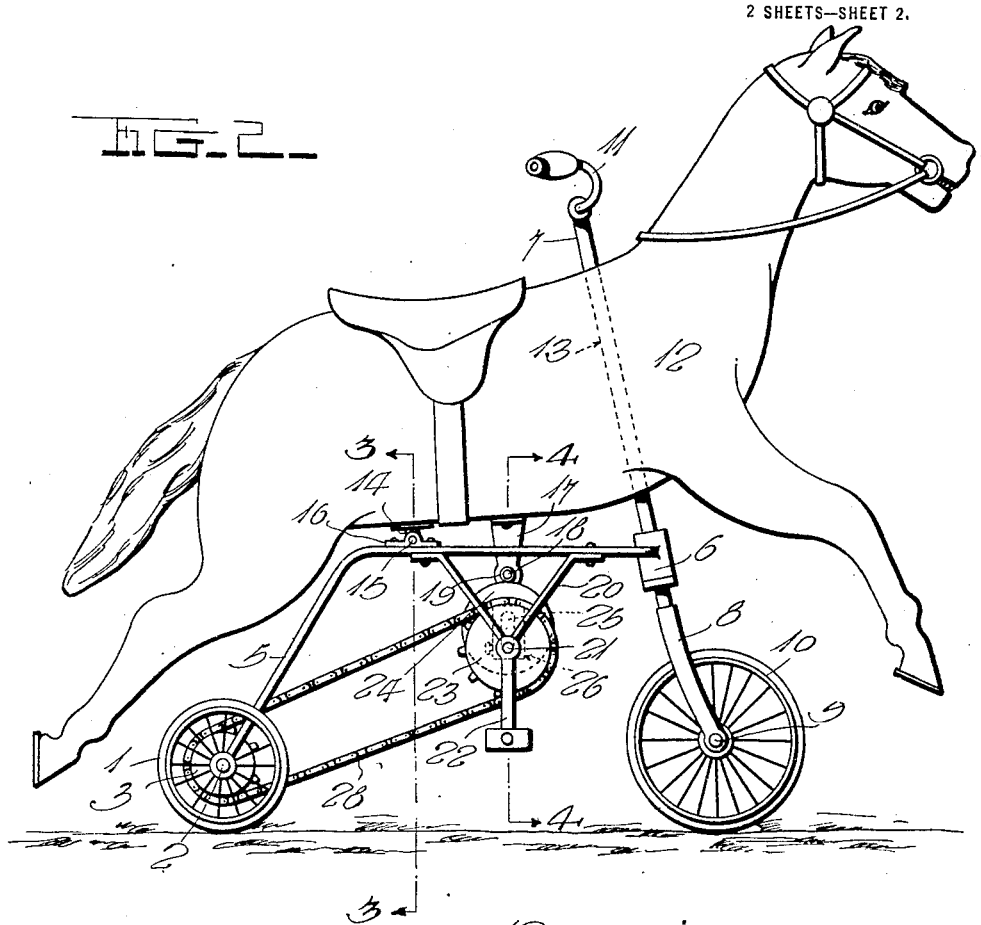

DANIEL F. TRACEY, OF HUNTINGTON, WEST VIRGINIA, ASSIGNOR TO THE LOPING HORSE & NOVELTY CO., OF HUNTINGTON, WEST VIRGINIA, A CORPORATION OF WEST VIRGINIA.

HOBBYHORSE.

1,396,475.    Specification of Letters Patent.    Patented Nov. 8, 1921.

Application filed December 15, 1919. Serial No. 345,096.

*To all whom it may concern:*

Be it known that I, DANIEL F. TRACEY, a citizen of the United States, residing at Huntington, in the county of Cabell and State of West Virginia, have invented new and useful Improvements in Hobbyhorses, of which the following is a specification.

One object of this invention is the utilization of a tricycle structure in connection with a hobby-horse whereby the propelling mechanism will impart a loping motion to the horse or allow the same to remain in a level position as desired, and with greater ease to the operator in the propulsion of the device than is possible with those now in use.

Another object is the provision of a tricycle structure which may with slight inconvenience be employed with any hobby-horse of the usual type, and so designed as to position the rider directly above the hinged connection, thereby rendering the device almost as easily propelled when a loping motion is imparted, as when the horse is allowed to remain in a level position, and so constructed as to relieve the great strain upon parts now prevalent in devices of this character.

Further objects are: the production of a device inexpensive to manufacture, comprising few parts, durable in use, and efficient in operation.

With these and other objects in view, which will become apparent as the description proceeds, the invention resides in the construction, combination and arrangement of parts, hereinafter more fully described and claimed, and illustrated in the accompanying drawings, in which like characters of reference indicate like parts throughout the several figures, of which:

Figure 1 is a perspective view of my improved hobby-horse;

Fig. 2 is a side elevation;

Fig. 3 is a fragmentary vertical section taken on the line 3—3 of Fig. 2; and

Fig. 4 is a fragmentary vertical section taken on the line 4—4 of Fig. 2.

Briefly, this invention comprises a tricycle upon which is mounted the simulation of a horse hingedly connected to the frame, and carrying a depending tappet adapted to contact with a cam-wheel adjustably mounted on the pedal shaft adjacent the drive sprocket, so that it may either be positioned eccentrically or concentrically with respect to said shaft to impart a loping motion to the horse or allow it to remain in stationary position as desired.

In the illustrated embodiment characterizing this invention, 1 indicates the rear wheels suitably journaled to the extremities of shaft 2, to which shaft substantially intermediate its length is keyed sprocket 3.

Journaled on the shaft 2 on either side of the sprocket 3, as at 4, and substantially adjacent wheels 1 are the supporting frame members 5, which extend upwardly, inwardly and forwardly terminating in a steering post bearing and guide member 6 integrally formed therewith.

Steering post 7 is retained in position by bearing 6, its lower portion being formed with a fork member 8 the lower extremities of which are adapted to carry shaft 9 on which is journaled front wheel 10 of conventional type, its upper extremity being provided with handle bars 11 of the usual design.

The horse 12 is formed with bore 13 at or near the shoulders thereof through which extends steering post 7, said bore being of sufficient diameter and to prevent any interference with it when a vertical movement is imparted to the horse.

In order that an oscillatory or loping motion may be imparted to the horse with little strain upon the mechanism of the device and a minimum of effort to the operator, the horse is hingedly attached to the frame at a point substantially in vertical alinement with the position of the rider or operator as follows: Secured in any suitable manner to the body of the horse 12 is a bearing 14 carrying a shaft 15 on the opposite extremities of which are positioned bearing plates 16 bolted or otherwise properly secured to frame members 5.

Slightly forward of and in alinement with bearing plate 14 is an L-shaped depending tappet 17 bolted or secured in any suitable manner to the body portion of horse 12, and secured to its free extremity is shaft 18 carrying roller bearing 19.

Secured to the under surfaces of frame members 5 and in vertical alinement with tappet 17 are depending V-shaped hangers 20 with their lower ends adapted to act as bearings for shaft 21, to the opposite terminals of which are attached adjustable pedals 22 for the purpose of transmitting power to said shaft. Mounted upon shaft 21 intermediate hangers 20 and in spaced relation is power sprocket 23 and cam wheel 24, the latter not only acts as a track for tappet 17 but determines the movement of horse 12, depending upon its adjustment eccentrically or concentrically with respect to shaft 21. In order that the cam wheel 24 may be adjustably positioned upon shaft 21, that is, either eccentrically or concentrically, to impart an even motion to the horse through the instrumentality of tappet 17 or a loping motion as desired, a slot 25 is provided extending outwardly from the center toward the periphery of the cam wheel, and corresponding to the configuration of the slot 25 is an integrally formed outstanding hub or flange 26 provided with openings 27 through which a set screw may extend to engage shaft 21 to retain cam wheel 24 in any desired position. Trained around power sprocket 23 and sprocket 3 is sprocket chain 28 for the purpose of transmitting power to the rear wheels in the usual well known manner.

From the preceding structural outline it will be observed the operation of this mechanism is as follows:

Assuming the rider positioned astride of the horse with feet resting on the pedals, when force is exerted against the pedals power will be transmitted to shaft 21, sprocket 23, chain 28, sprocket 3, shaft 2, and to wheels 1, which it is obvious will propel the device forward or backward as desired. During the above operation power is also transmitted from shaft 21 to cam wheel 24 whose contacting surface with roller bearing 19 on tappet 17 imparts motion to the body or horse 12.

When it is desired that the horse 12 remain in stationary or level position, the cam wheel 24 is positioned concentrically, and when an oscillatory or loping motion is desired said cam wheel is positioned off of center or eccentrically of the shaft 21, causing the circumference of the wheel 24 to describe an elliptical arc and causing the tappet 17 to oscillate the horse 12 about the axis or shaft 15, in what is understood to be a loping motion.

From the foregoing it is apparent that I have designed a hobby-horse of great adaptability, eliminating the inherent deficiencies of those now in use, efficient in operation, simple in construction, and inexpensive to manufacture.

Although in the foregoing, certain elements may have been set forth as best adapted to perform the functions allotted to them, nevertheless, it is to be understood that various minor changes as to form, substance, etc., may be resorted to within the scope of the appended claim without departing from or sacrificing any of the principles of this invention.

Having thus described my invention, and without enumerating variations and equivalents, what I desire protected by Letters Patent is as set forth in the following claim:

In a tricycle, a frame, including a steering means for the front wheel, and rear driving wheels, a drive shaft suspended beneath the frame intermediate its wheels, a drive sprocket keyed to said shaft, a propelling connection between the drive sprocket and rear wheels, a cam positioned on the sprocket shaft, said cam being adjustable to effect its eccentric and concentric positioning with respect to the shaft, a body hingedly mounted adjacent its rear extremity to the frame, and a tappet depending from the body and riding said cam to produce a loping motion of the body when said cam is mounted eccentrically of the sprocket shaft, and an even motion when mounted concentrically of said shaft, substantially as described.

DANIEL F. TRACEY.

Witnesses:
  GEO. L. SUMMERS,
  CECIL WILLIAMS.